(12) United States Patent  
Gazzola et al.

(10) Patent No.: US 8,295,701 B2
(45) Date of Patent: Oct. 23, 2012

(54) ADAPTIVE HYBRID OPTICAL CONTROL PLANE DETERMINATION OF LIGHTPATHS IN A DWDM NETWORK

(75) Inventors: Maurizio Gazzola, Milan (IT); David Bianchi, Cambiago (IT); Stefano Piciaccia, Milan (IT); Gabriele Maria Galimberti, Bovisio Masciago (IT)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 12/504,864

(22) Filed: Jul. 17, 2009

(65) Prior Publication Data
US 2011/0013908 A1    Jan. 20, 2011

(51) Int. Cl.
*H04B 10/00*    (2006.01)
(52) U.S. Cl. ............... 398/70; 398/72; 398/58; 398/57; 398/51
(58) Field of Classification Search ............... 398/58–64
See application file for complete search history.

(56) References Cited

U.S. PATENT DOCUMENTS

| | | | | |
|---|---|---|---|---|
| 6,085,335 A * | 7/2000 | Djoko et al. | | 714/26 |
| 6,370,572 B1 * | 4/2002 | Lindskog et al. | | 709/223 |
| 6,741,572 B1 * | 5/2004 | Graves et al. | | 370/254 |
| 6,917,759 B2 * | 7/2005 | de Boer et al. | | 398/5 |
| 7,013,084 B2 * | 3/2006 | Battou et al. | | 398/45 |
| 7,171,124 B2 * | 1/2007 | Smith et al. | | 398/97 |
| 7,249,169 B2 * | 7/2007 | Blouin et al. | | 709/220 |
| 7,403,988 B1 * | 7/2008 | Blouin et al. | | 709/223 |
| 7,457,277 B1 | 11/2008 | Sharma et al. | | |
| 7,860,392 B2 * | 12/2010 | Hoang et al. | | 398/57 |
| 7,983,558 B1 * | 7/2011 | Gerstel et al. | | 398/25 |
| 2002/0131103 A1 | 9/2002 | Bambos | | |
| 2003/0163555 A1 * | 8/2003 | Battou et al. | | 709/223 |
| 2005/0089027 A1 * | 4/2005 | Colton | | 370/380 |
| 2007/0121507 A1 | 5/2007 | Manzalini et al. | | |
| 2009/0162060 A1 | 6/2009 | Vasseur et al. | | |

* cited by examiner

*Primary Examiner* — Agustin Bello
(74) *Attorney, Agent, or Firm* — Edell, Shapiro & Finnan, LLC

(57) ABSTRACT

Techniques and a control architecture (apparatus and logic) are provided for an adaptive hybrid DWDM-aware computation scheme. The architecture is one that is a hybrid of a centralized control scheme and a distributed control scheme that performs adaptive physical impairment computations for an optical network. A central control server is connected to multiple client control devices each of which resides in a node in a dense wavelength division multiplexed (DWDM) optical network, wherein each client control device is part of an optical control plane associated with the optical network. The control server obtains data for path route analysis from the client control devices. The control server then determines optical feasibility of at least one path route from a source node to a destination node from optical parametric information based on the data obtained from multiple client control devices and without real-time communication between the central control server and the multiple client control devices while performing the optical feasibility computations.

19 Claims, 14 Drawing Sheets

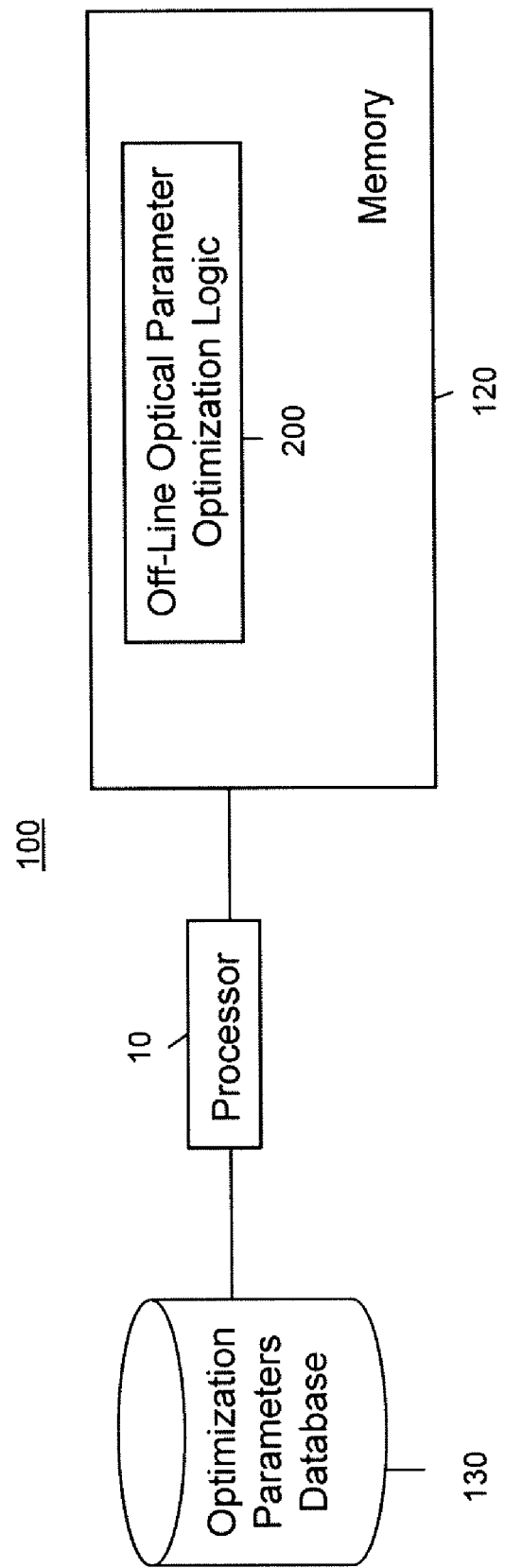

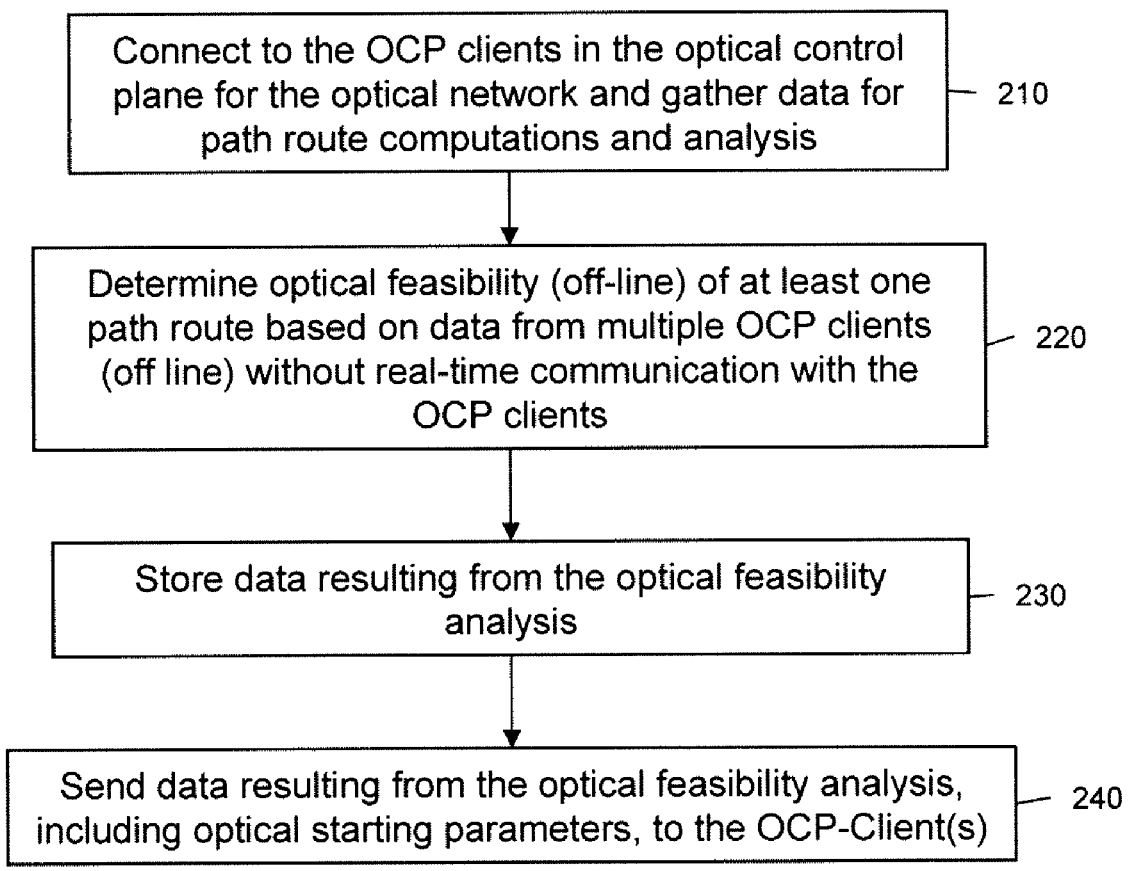

ADAPTIVE HYBRID OPTICAL CONTROL PLANE DETERMINATION OF LIGHTPATHS IN A DWDM NETWORK

BACKGROUND OF THE INVENTION

The present disclosure is related to techniques of determining a path in dense wavelength division multiplexed (DWDM) networks.

DWDM networks are optical networks in which optical signals at different wavelengths share an optical fiber. Each wavelength defines a particular communication channel. In a stricter sense, DWDM also refers to an ITU (International Telecommunications Union) standard which includes the specification of the particular channel wavelengths and the spacings between these channels and is based upon WDM (Wavelength Division Multiplexing), an earlier ITU standard in which the channel spacings were further apart and a smaller number of wavelength channels were carried by an optical fiber. It should be noted that the term DWDM, as used herein, refers to the first, more inclusive sense so as to include the ITU WDM and DWDM standards, unless specifically stated otherwise.

For communication to be established between the source of the communication and its destination in a network, a path must be selected through the network nodes. The network path is determined by the control plane of the network. At each network node there is a control unit which, linked to other control units at other nodes of the network, selects the path of a communication from the node. The aggregate of the control units form the control plane of the network which, after determining the path, sets up the path of a communication from its source to its destination through the network nodes. Common technologies for such path determination are, e.g., IP (Internet Protocol), Frame Relay, ATM (Asynchronous Transfer Mode) and Ethernet, and a technology which fits over such older technologies is MPLS (MultiProtocol Label Switching) and its latest version GMPLS (Generalized MPLS). An emerging standard is PCE (Path Computation Engine) by which a server computes a path through the network.

These electronic control plane technologies are adapted for electronic networks. But unlike electronic networks, not only must the physical path of the communication through a DWDM network be determined, but also its wavelength. Furthermore, the nature of the optical signals requires that optical parameters, e.g., the attenuation, chromatic dispersion between the nodes and the like, be considered in the proper selection of an optical path to ensure that signals reach their intended destination in proper condition. Otherwise, the optical signals must be regenerated at one or more intermediate nodes between source and destination.

Control planes of proposed optical networks either do not appear to have considered the problems and requirements of routing a communication through an optical network without regeneration, or the nodes of the proposed network are packed with optical parametric information so that each node can properly calculate the routing connections. In such cases, the processors at the nodes often require so much computing power and time to process the complex routing algorithms that routing operations are slowed. The result is that either the problem of optical networks is ignored completely or the proposed solution adversely affects the operations of the network.

The present invention provides for optical control planes which while highly suitable for routing a communication through an optical network, are easily adaptable with electronic control planes.

BRIEF DESCRIPTION OF THE DRAWINGS

FIG. 7 is a block diagram of a central control server used in architecture shown in FIG. 6.

FIG. 8 is an example of a flow chart for off-line optical parameter optimization logic executed by the central control server shown FIG. 7.

DESCRIPTION OF EXAMPLE EMBODIMENTS

Overview

Techniques and a control architecture (apparatus and logic) are provided for an adaptive hybrid DWDM-aware computation scheme. The architecture is one that is a hybrid of a centralized control scheme and a distributed control scheme that performs adaptive physical impairment computations for an optical network. A central control server is connected to multiple client control devices each of which resides in a node in a dense wavelength division multiplexed (DWDM) optical network, wherein each client control device is part of an optical control plane associated with the optical network. The control server obtains data for path route analysis from the client control devices. The control server then determines optical feasibility of at least one path route from a source node to a destination node from optical parametric information based on the data obtained from multiple client control devices and without real-time communication between the central control server and the multiple client control devices while performing the optical feasibility computations. The control server stores data pertaining to optical feasibility determined for the at least one path route.

Example Embodiments

Figure 1:
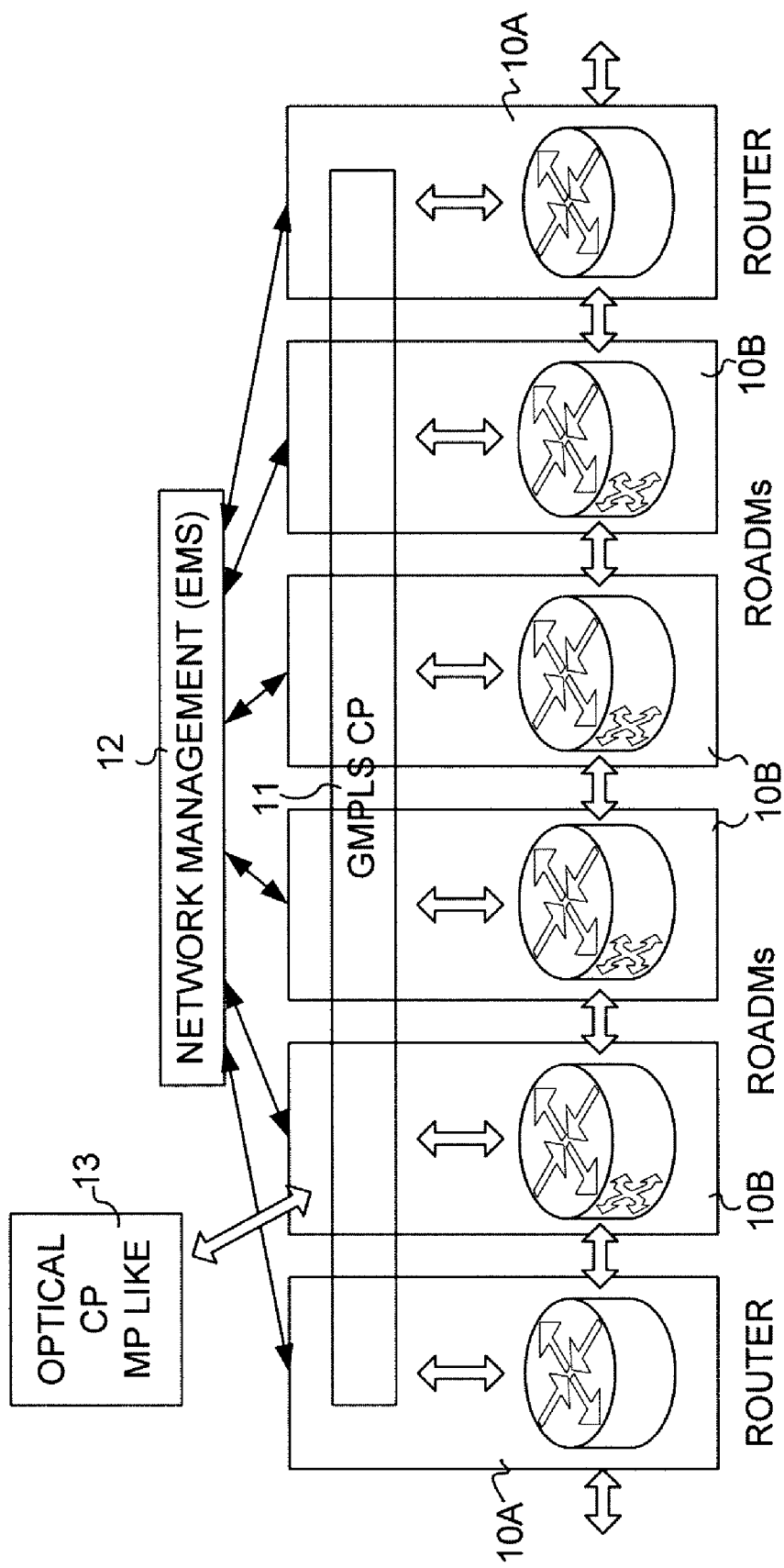
FIG. 1 shows a representative optical network in which an optical control plane is external to the nodes of the optical network according to one embodiment.

A representative DWDM network is illustrated in FIG. 1. The nodes 10 of the optical network are represented by router nodes 10A and add/drop nodes 10B in the form of ROADMs (Reconfigurable Optical Add/Drop Multiplexers). Typically OADMs (Optical Add/Drop Multiplexers) imply that optical signals of one or more fixed wavelengths are dropped and/or added at the node and that ROADMs imply that the added and/or dropped wavelengths at the node can be changed or reconfigured. The ROADMs are shown in the drawings for purposes of generality and should not be considered a limitation.

In an optical network routers handle the main switching functions of the optical network at the nodes 10A. The add/drop nodes 10B provide entry (add) and exit (drop) points to the network. Hence source and destination nodes of a message in the FIG. 1 network are the add/drop nodes 10B. While only four of add/drop nodes 10B are shown, these are merely representative of the nodes 10B in the network. Arrows show that router nodes 10A are connected to more nodes 10B (and other router nodes 10A). The network connections between nodes 10A and 10B can be quite complex and an electronic network control plane 11 here operating under GMPLS handles the routing of a message between some source and destination nodes 10B. Over the electronic network control plane 11 is a network management system 12 which handles the higher supervisory and control functions of the network.

As described earlier, the electronic control plane 11 determines the path and routes messages through the network, but it does not take into account any optical impairments along the routing path. The electronic control plane 11 associated with each network node 10 has the standard information of basic fiber connectivity between nodes for routing a communication. The electronic control plane 11 does not have the detailed information on the optical performance of the links between the nodes, i.e., the optical impairments introduced by components along a potential path, such as noise by an amplifier or insertion loss through a switching device. Furthermore, the electronic control plane 11 does not know the detailed configuration of the nodes themselves. For example, the electronic control plane 11, while in intimate communication with a node, does not know whether it has a ROADM (Reconfigurable Optical Add/Drop Multiplexer) or a simpler OADM, or whether the node has a pre-amplifier and a booster amplifier, or only one amplifier.

In accordance with the present invention, an optical control plane (OCP) which is distinct from the electronic control plane 11 determines the optical feasibility of a routed path. The distinct OCP can be installed and upgraded over the electronic control plane 11 without interrupting existing networks. This "modularization" approach has the benefits of easy implementation and standardization. The OCP receives information of the optical elements in the network so that the optical feasibility of a path from its source node to its destination node can be determined from the optical parameters of the signal along the path. If the optical feasibility is determined to be negative, the optical impairments of the path exceeds predetermined thresholds, the OCP generates an error message and requests the electronic control plane to find a new route. This ensures that the paths routed through the network are optically feasible.

In the FIG. 1 network, the OCP runs on an external server 13 which communicates with the network control plane 11, according to one embodiment of the present invention. The OCP server 13 which is removed from the electronic control plane 11, checks the optical feasibility of a path routed by the electronic network plane 11. The server 13 can operate with a GUI (Graphical User Interface) for ease of operation and with relatively unlimited processing power and memory to determine the optical feasibility of path routes. The server can also be upgraded without affecting network operations.

Figure 4:
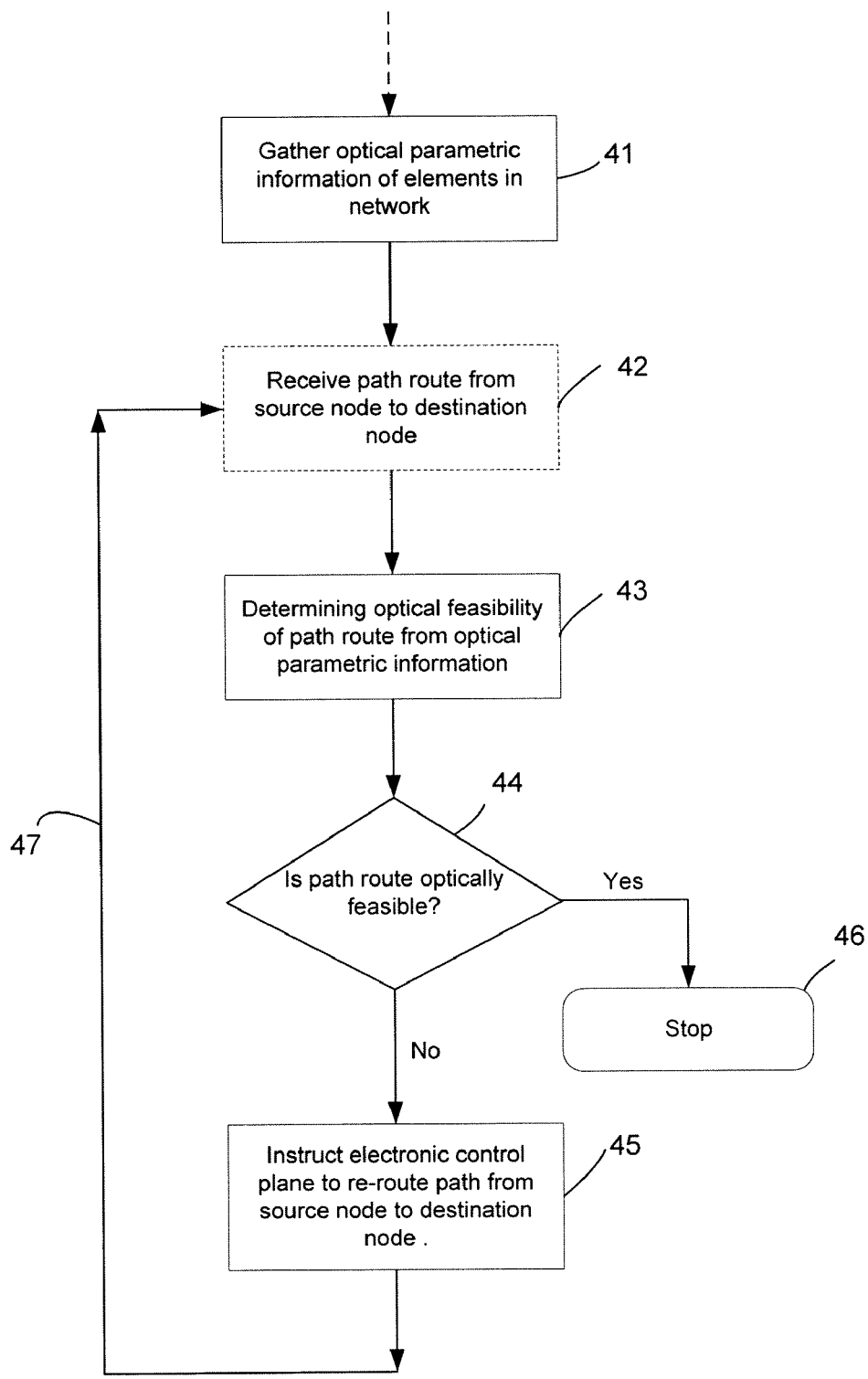
FIG. 4 is a flow chart of the more general operations of the different optical network arrangements of the present invention.

FIG. 4 is a flow chart of the operations of the OCP. It is assumed that the OCP is operating in some manner so that the first step 41 is shown as part of an ongoing process. In step 41 the OCP gathers optical parametric information on the elements of the network, i.e., the OCP obtains information on the network elements which affect optical signals passing through the network. The term, "gathers," is used to include actions in which the OCP is passive and receives network element optical information sent to the OCP. In step 42 the OCP receives a path routed by the electronic control plane 11 for a communication from its source node to its destination node. Step 43 checks the optical feasibility of the path from the optical parametric information. The OCP calculates whether an optical signal along the path route from the source node to the destination node meets predetermined signal criteria from the optical parametric information. Stated differently, is the optical signal sufficiently robust after passing through network elements along the path route or has it been degraded to such an extent that it cannot be recovered at the destination node? Optical parametric information about the network elements include optical noise (how much noise is created in the signal by the elements), optical power (how much signal power is attenuated by the elements), wavelengths (at what wavelengths is the signal), and tilt (how has the signal been tilted after passing the previous nodes and/or elements). All of this information can be used to calculate the optical feasibility of the path routed by the electronic network 11. For example, thresholds can be set for each of these optical parameters for a signal to reach its destination node from its source node and calculations determine whether these thresholds are met or not.

In decision step 44 the path route is checked whether it is optically feasible? If yes, then the process stops at step 46. If not, then step 45 has the OCP to instruct the electronic control plane 11 to re-route the path and the process starts over by loop 47 to step 42.

Figure 2A:
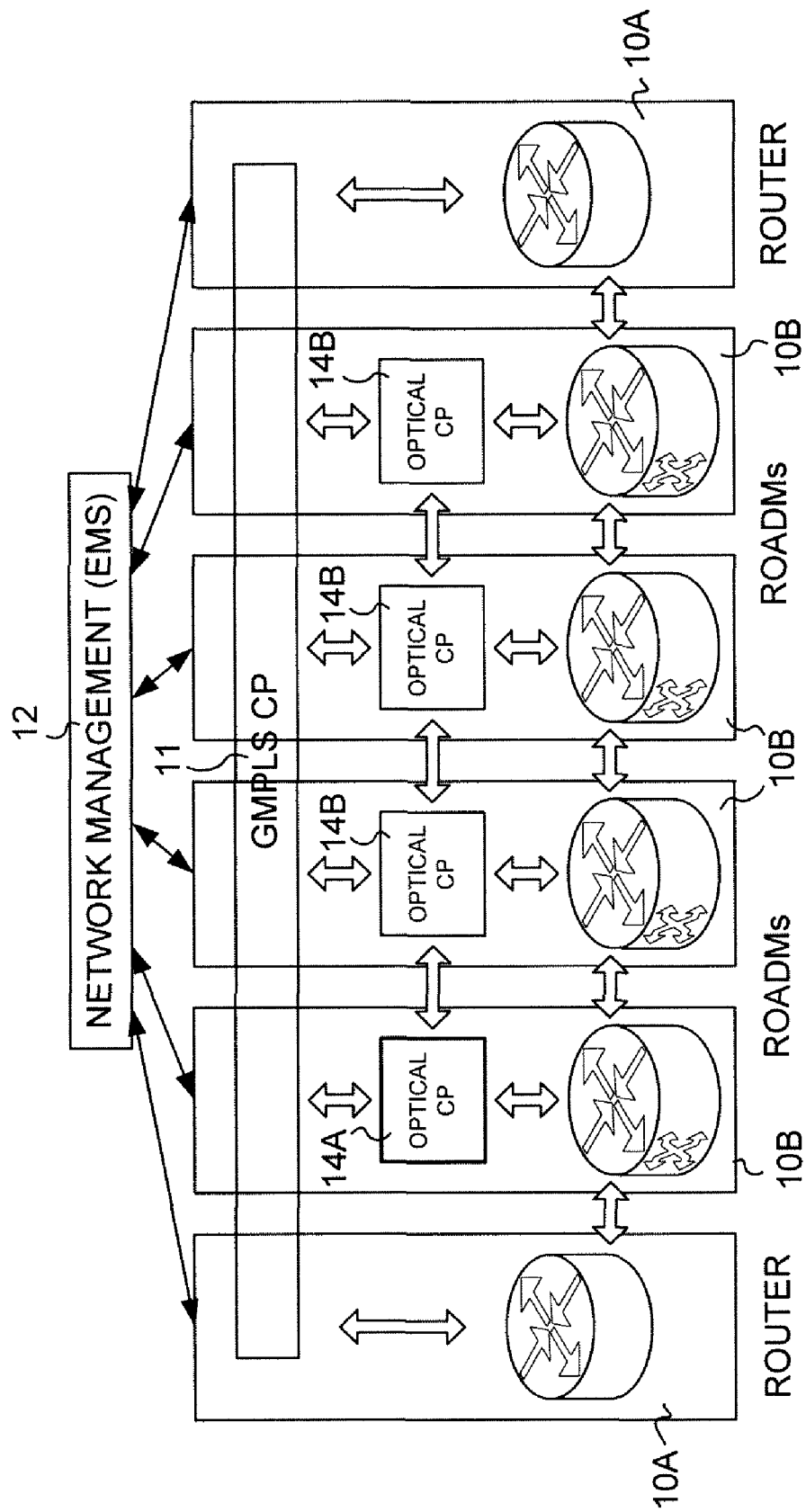
FIG. 2A shows a representative optical network in which the optical control plane is embedded into the nodes of the optical network and one of the OCP nodes checks the optical feasibility of a path route, according to another embodiment.

FIG. 2A illustrates another embodiment of the present invention. Here the optical control plane 14 is physically distributed across the nodes 10B of the optical network. It should be noted that the same reference numbers are used to indicate elements which are identical or substantially similar in function or operation as in earlier drawings. All the parts 14 of the distributed OCP gather optical parametric information on the network elements (step 41 in FIG. 4) but in this embodiment, only a part 14A (illustrated by a darkened border) of the OCP receives the path route information from the electronic control plane 11 (step 42), determines the optical feasibility of the path route (step 43, (step 44); and (step 45) optical control plane checks channel feasibility. The other parts 14B of the optical control plane do not. The OCP part 14A is selected according to the path route from the electronic control plane 11 to be either near the source node or the destination node. It should be noted that the OCP is located at the add/drop nodes 10B of the WDM network. In contrast to the nodes 10B, the routers at the nodes 10A regenerate, reshape and retime optical signals so that the functions of the OCP are not required at these switching nodes.

Figure 2B:
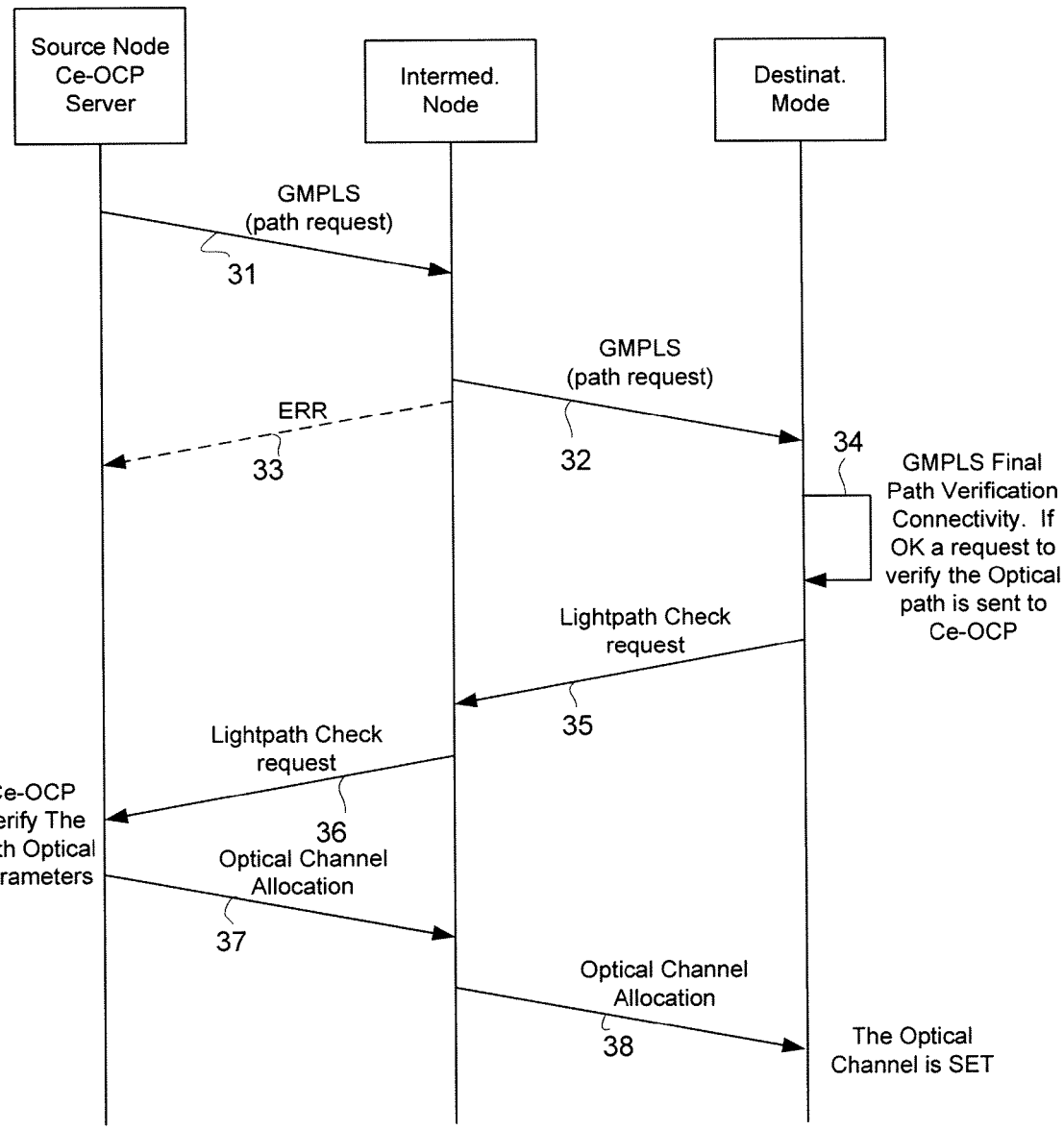
FIG. 2B shows the operation of the nodes of the FIG. 2A network.

FIG. 2B illustrates the operation of the FIG. 2A network in more detail. The source node holds the OCP part 14A described above and sends a GMPLS path request message 31 to the destination node through one or more representative node(s). The representative node sends either a GMPLS error message 33 or relays the path request 32 to the destination node. The destination node, upon verification of the GMPLS path connectivity, sends a request 35 back toward the source node to verify the lightpath. The intermediate node relays the request 36 to the source node which determines the optical feasibility of the path route. If the path route is determined to be feasible, the source node sends a optical channel allocation message 37 and 38 to the destination node.

Figure 2C:
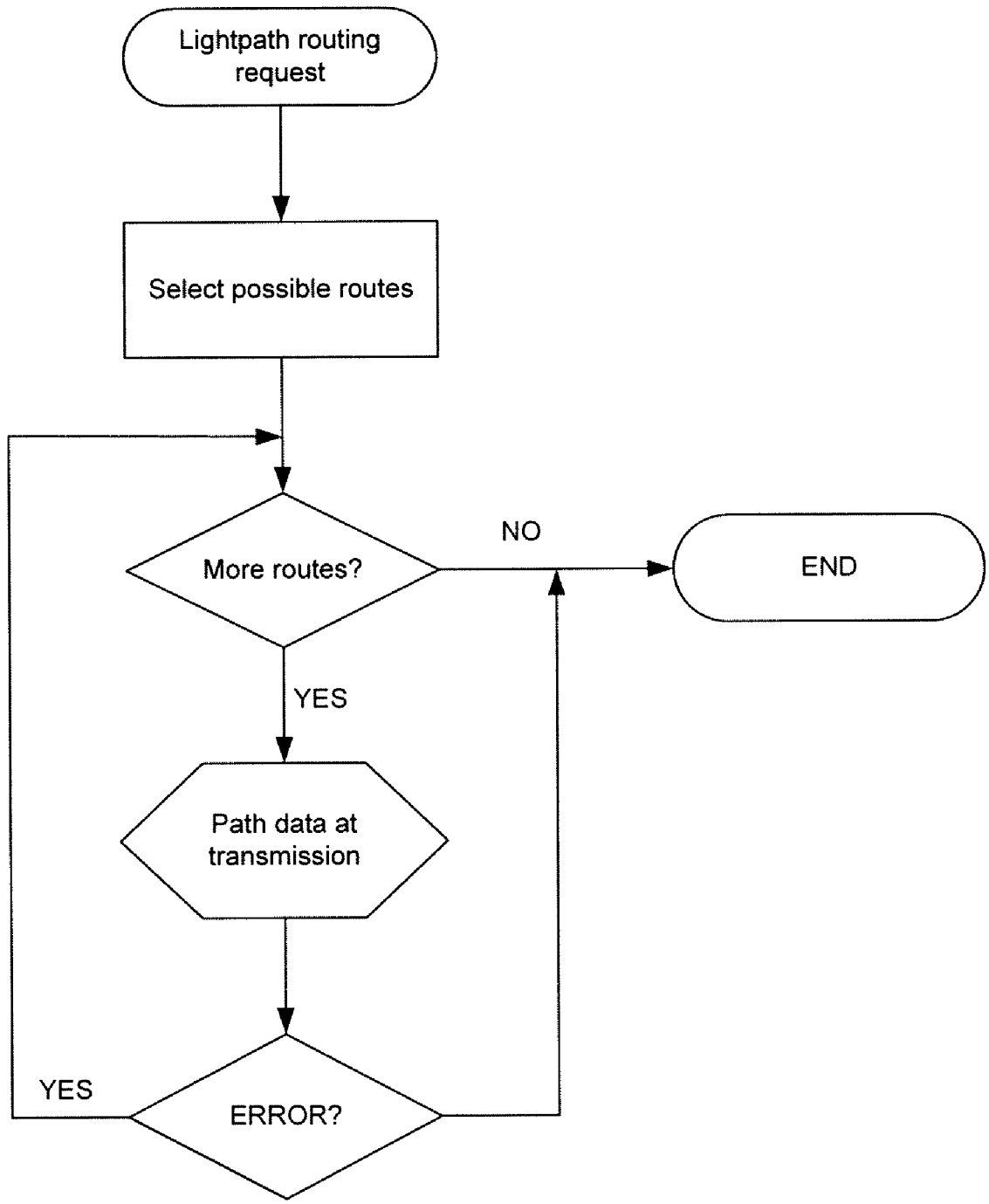
FIG. 2C shows the flow chart of operations of the source node.
Figure 2D:
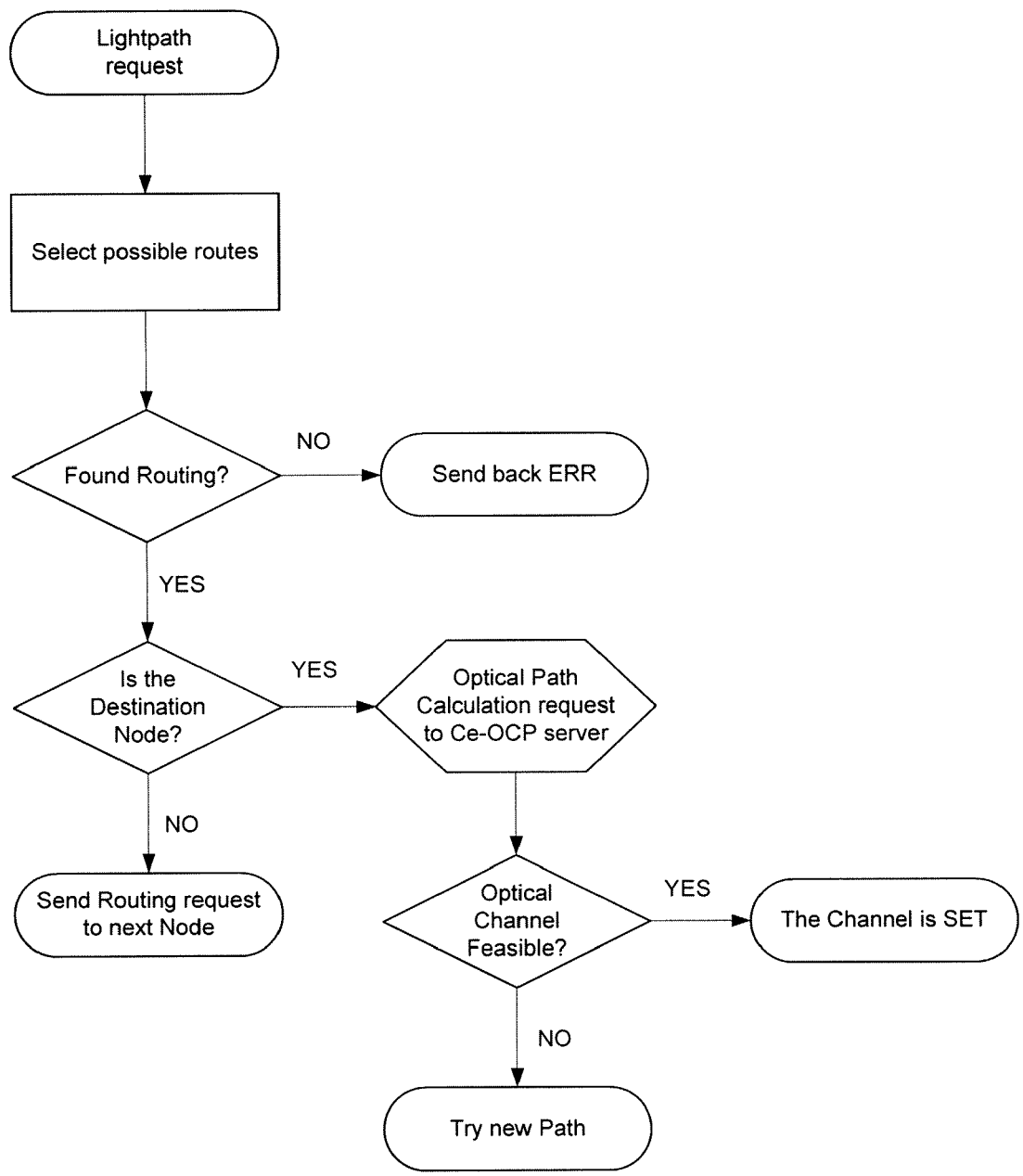
FIG. 2D shows the flow chart of operations of the intermediate and destination nodes.

FIGS. 2C and 2D show flow charts of operations of the source node and intermediate/destination nodes, respectively.

Figure 3A:
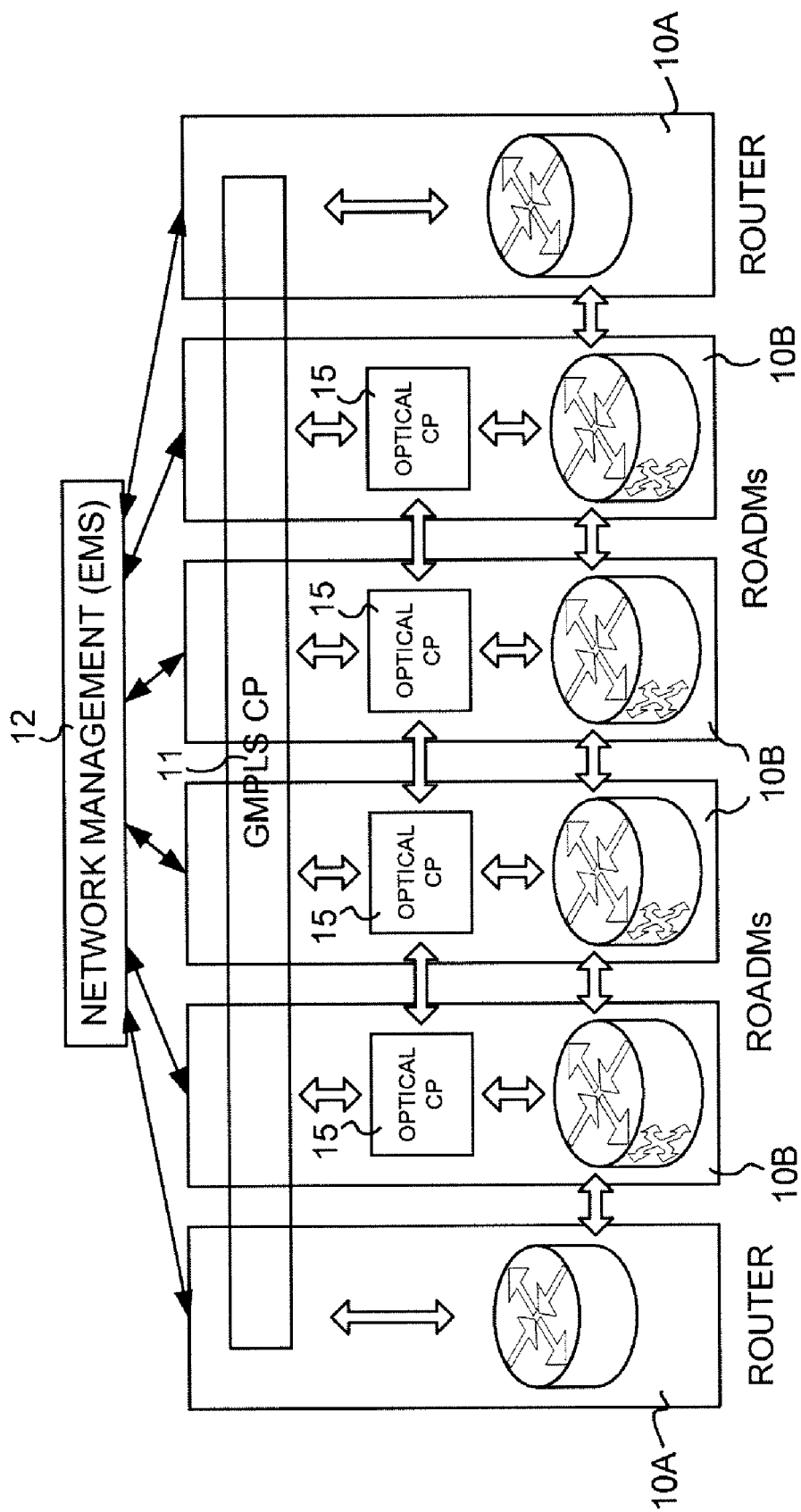
FIG. 3A shows a representative optical network in which the optical control plane is embedded into the nodes of the optical network and all of the nodes participate to check the optical feasibility of a path route, according to still another embodiment of the present invention.

The OCP illustrated in FIG. 3A also follows the operations illustrated in FIG. 4. In the optical network of FIG. 3A the optical control plane is also distributed in parts 15 across the nodes 10B of the network. In this embodiment of the present invention, however, each part 15 of the OCP gathers optical parametric information on a limited basis and the distributed OCP participates in the determination of the optical feasibility of the optical path between the source and destination nodes 10B. Each OCP part 15 gathers optical parametric information about the optical elements of the node in which the OCP part 15 is embedded and uses this information to determine the optical feasibility of a path. The amount of information gathered at each node is relatively little and can be obtained from information of the manufacturer of the elements or from previous behavior of the elements.

For a path routed by the electronic control plane, the nodes along the path through the embedded OCP part 15 sequentially receives a probe message from a previous node along the path to determine the optical feasibility of the path up to the current node. If the OCP part 15 at the node determines optical feasibility is negative, the OCP part 15 instructs the electronic control plane to re-route the path and the process is restarted from the source node. This allows for a quick elimination of unfeasible path routes. Otherwise, the probe message continues until the destination node is reached and the path route is confirmed.

The probe message could contain an explicit route or multiple probe messages could be flooded through the network in multiple directions by the source and/or by the intermediate nodes to determine path routes concurrently. To avoid any synchronicity in the sending of multiple probes by different source nodes, the transmission of the probes is timed by dynamic jitter which can easily be configured as a parameter of a network protocol. For multiple probe messages, the intermediate nodes manage concurrently received probes. For example, if two probes reach an intermediate probe, the first received probe message locks or blocks the "optical" resources of the node from the second received probe, and the second one fails because of the missing resources indicate a lack of optical feasibility. If the first probe fails, the resources in the intermediate node are unlocked and a notification message informs the second probe, or its source node, that resources are now available for the second probe message to try again, i.e., to determine its optical feasibility through the intermediate node. This mechanism applies to N probes reaching the intermediate node.

Figure 3B:
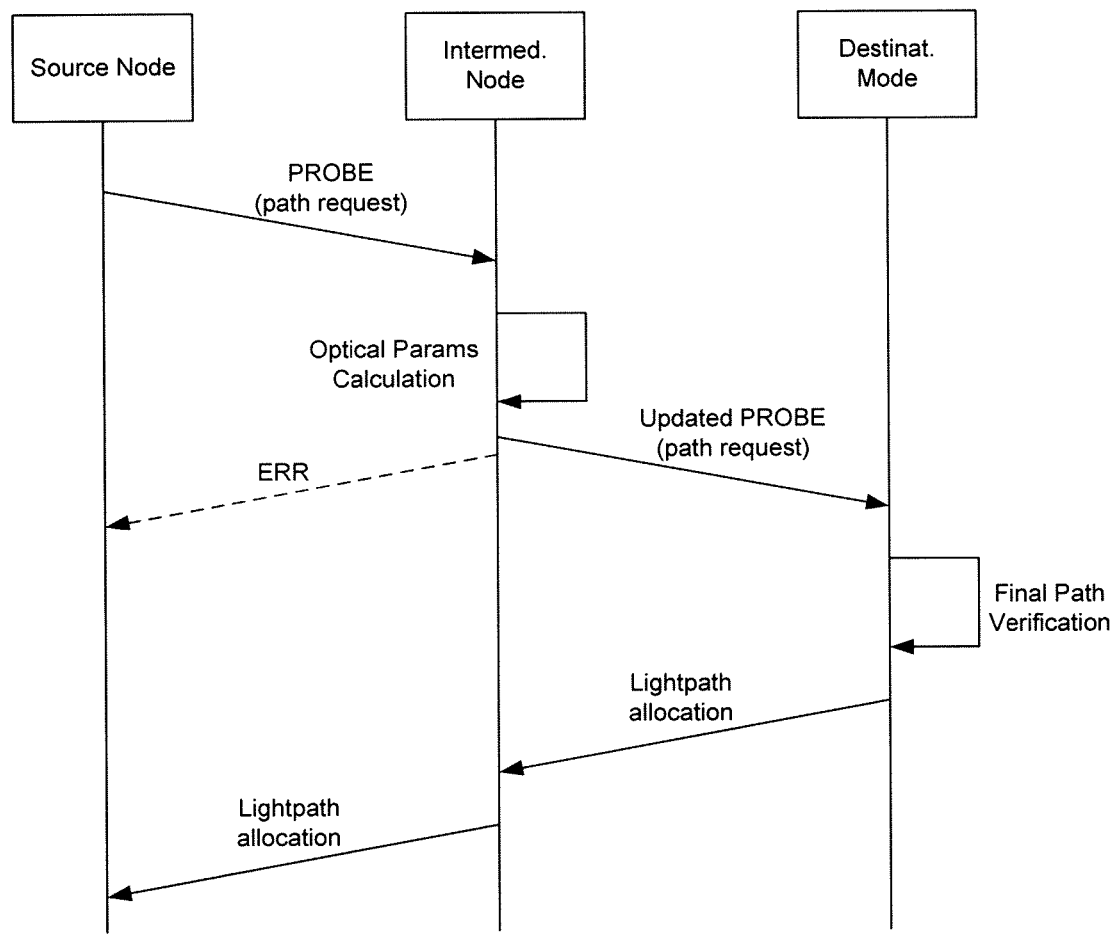
FIG. 3B shows the operation of the nodes of the FIG. 3A network.

FIG. 3B shows a simplified process for the source node, a single representative intermediate node and the destination node. Again it should be noted that the nodes intermediate the source and destination nodes of a communication can terminate one path route and engage the re-routing process. This allows early discards of unfruitful paths and speeds up the determination of an acceptable path route.

Figure 3C:
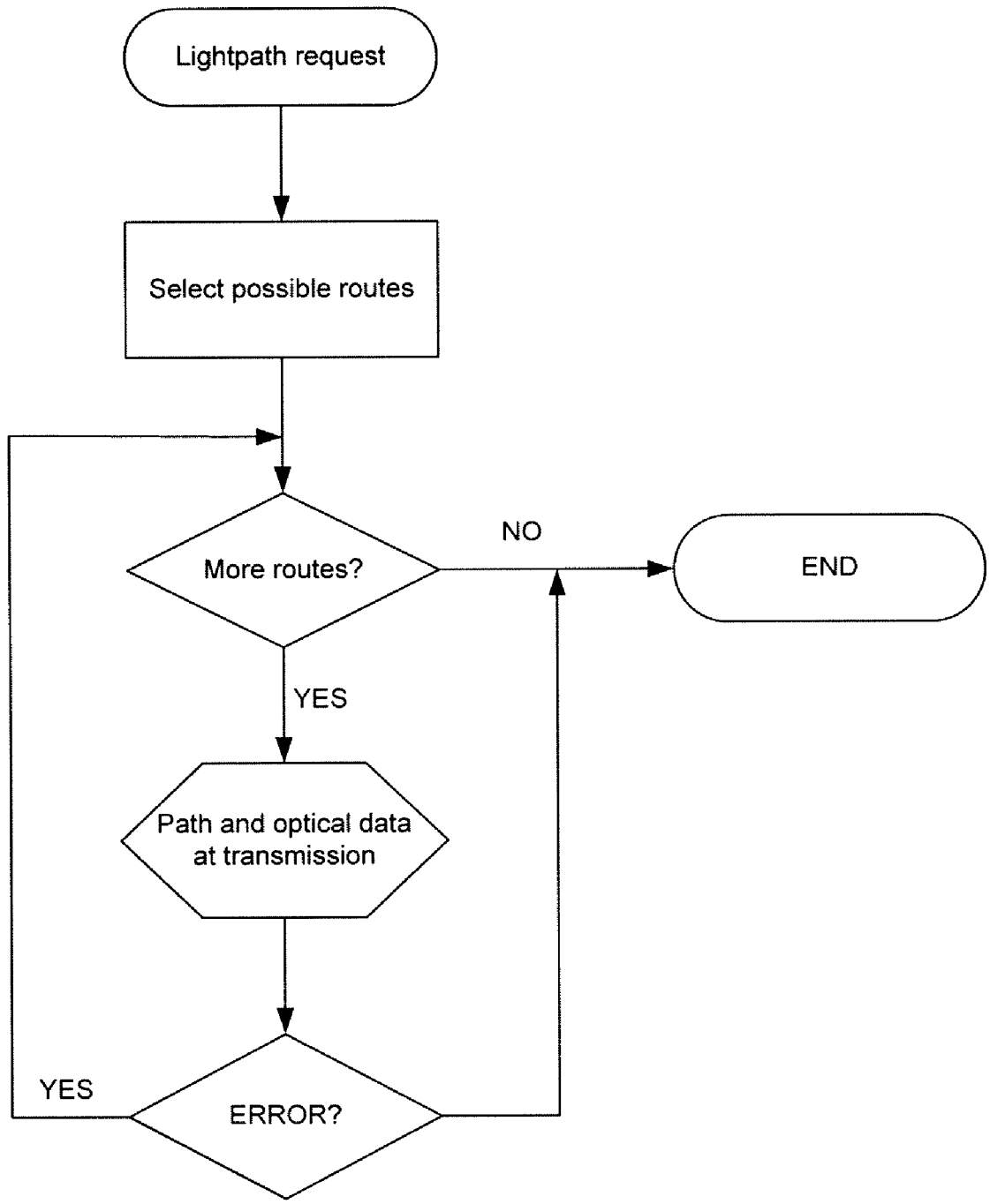
FIG. 3C shows the flow chart of operations of the source node.
Figure 3D:
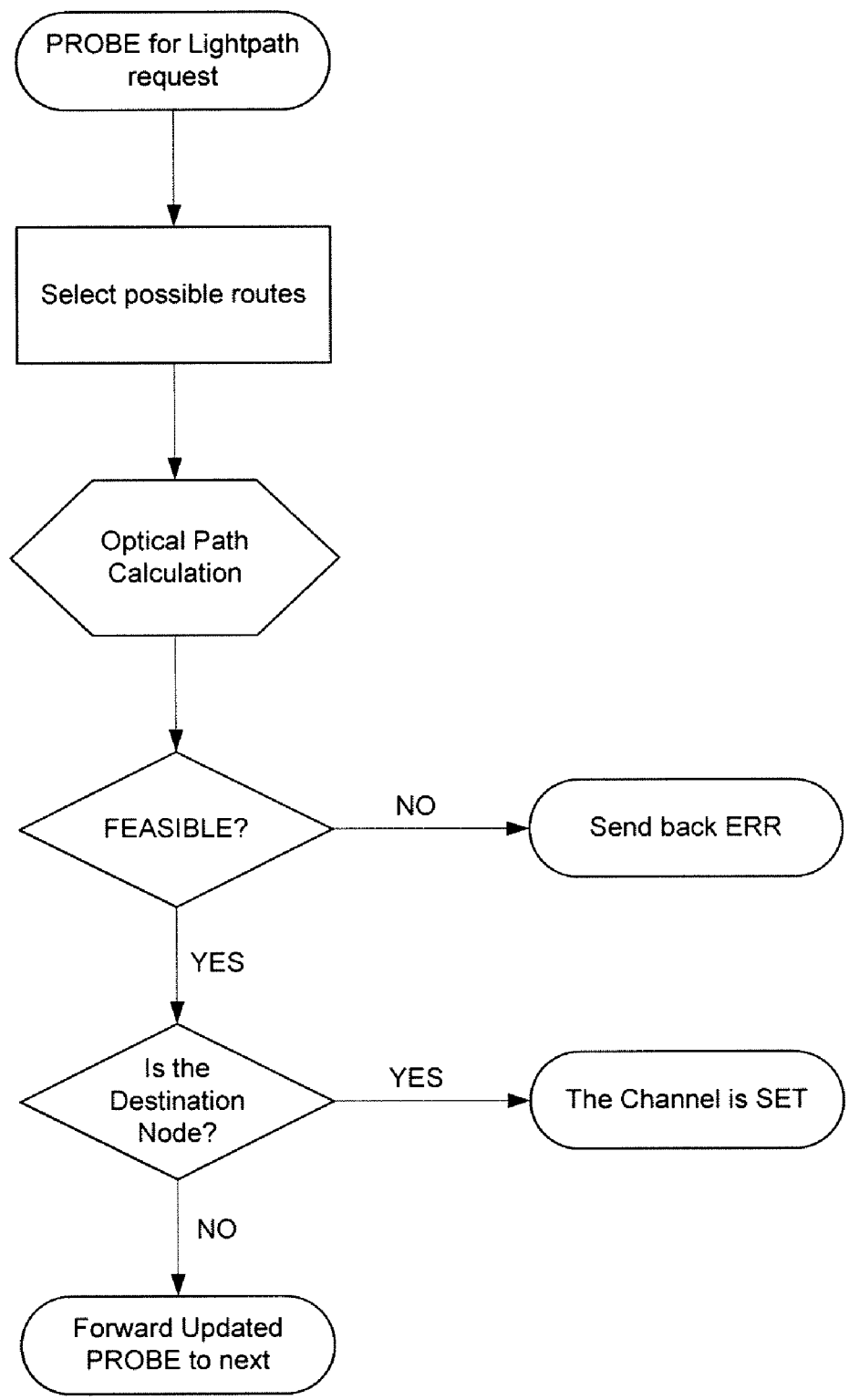
FIG. 3D shows the flow chart of operations of the intermediate and destination nodes.

FIGS. 3C and 3D show flow charts of operations of the source node and intermediate/destination nodes, respectively.

Hence a probe message tracks the optical impairments along the path route. In one particular embodiment, each probe message has two kinds of optical parametric information, "cumulative" and "recoverable." Cumulative parametric information refer to signal parameters, such as optical signal-to-noise ratio (OSNR), which can only vary monotonically as the signal proceeds along the path route and cannot be recovered upon reaching a certain limit. Recoverable parametric information refers to signal parameters, such as optical power, which can vary with the appropriate optical element (e.g., an optical amplifier) in the signal path. The probe messages start with an allowed optical budget for each optical parameter for the path based on the source transmitter, and the budget is decreased by every node as it is passed. The path is unfruitful and discarded if the budgets for both cumulative and recoverable optical parametric information falls below an amount necessary for the signal at the node to reach all its neighbors, or if just the budget for one of cumulative optical parametric information falls below a threshold T. The threshold T depends upon the remaining hops from the present node to the destination node and is, of course, greater than the threshold to reach the next hop in the path and should be at least as required by the hops remaining to reach the destination node. This can be calculated from historical data.

Figure 5:
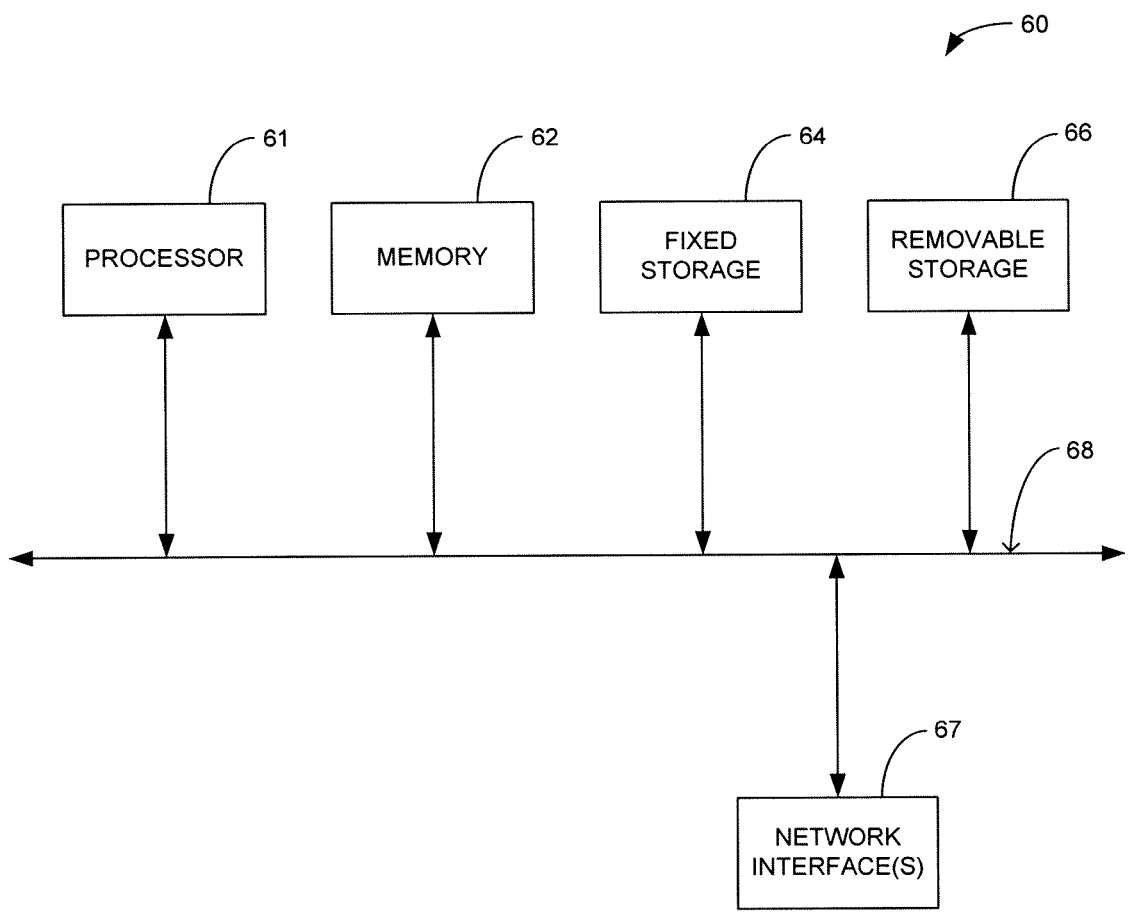
FIG. 5 represents an organization of a computing element which may act as an OCP server or OCP part embedded in a network node, according to another embodiment of the present invention.

FIG. 5 illustrates a block diagram of an example computing element 60 that may be used for the OCP, such as the server 13 in FIG. 1, or as an OCP part distributed over the nodes in FIGS. 2 and 3, according to one embodiment of the present invention. The computing element 60 includes a memory subsystem 62 which can store and retrieve software programs incorporating computer software code that implements aspects of the invention, data for use with the invention and the like, and a central processor subsystem 61 which, among other functions, processes the instructions and data of the computer code. Example computer readable storage media for the memory 62 include semiconductor system memory preferably, CD-ROM, floppy disk, tape, flash memory, and hard drive. The element 60 further includes subsystems, such as fixed storage 64 (e.g., hard drive), removable storage 46 (e.g., CD-ROM drive), and one or more network interfaces 67, all connected by a system bus 68. The network interface 67, for example, might provide the pathway through which OCP data and instructions, such as path messages previously described, are sent and received. Additional or fewer subsystems may be used. For example, element 60 may include more than one processor 61 (i.e., a multi-processor system), or a cache memory.

Figure 6:
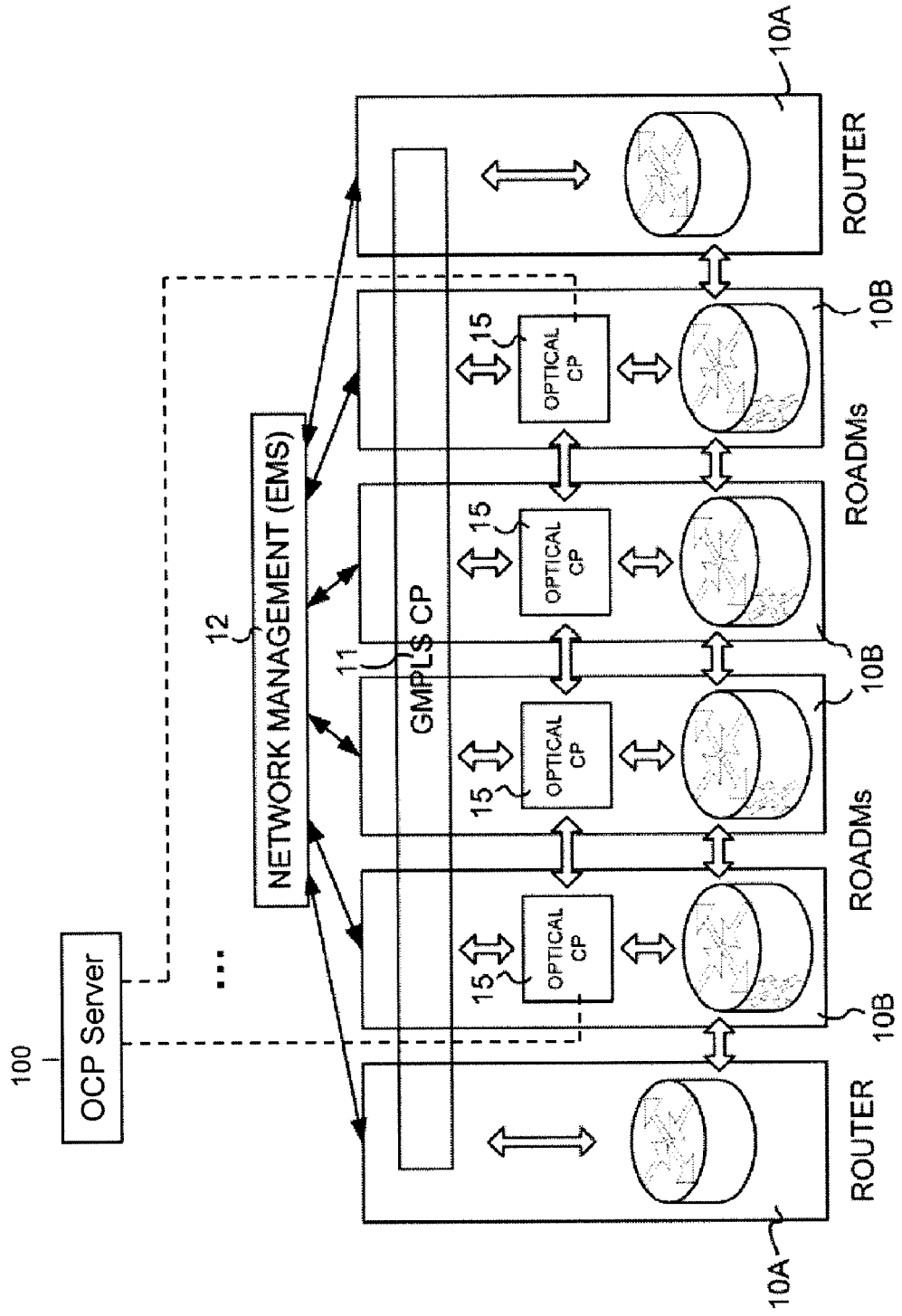
FIG. 6 is a block diagram of a hybrid centralized and distributed adaptive physical impairment computation architecture for an optical network.

Turning now to FIG. 6, a block diagram is shown for still another embodiment. In this embodiment, an adaptive hybrid DWDM-aware computation scheme is provided for a GMPLS-like OCP. In this scheme, a central OCP server 100 is provided. The architecture shown in FIG. 6 is a hybrid of a centralized control scheme and a distributed control scheme (e.g., the scheme of FIG. 3A) that performs adaptive physical impairment computations for an optical network. The OCP server 100 has a global view of the optical network in that it connects to and obtains information from each of the OCP clients 15, referred to herein also as OCP client control devices, within nodes of the optical network. The central OCP server 100 is configured to optimize "off-line" the optical starting parameters for a DWDM-aware calculation associated with an optical path through the network. Like the configuration shown in FIG. 3A, each node in the configuration shown in FIG. 6 is aware of the physical impairments related to its adjacent links only.

FIG. 7 illustrates a block diagram of the OCP server 100. The OCP server 100 comprises one or more data processors, e.g., microprocessor, digital signal processor, microcontroller, or other data processing apparatus, and memory 120. The memory 120 stores, among other data and information, computer software or processor instructions for off-line optical parameter optimization logic 200. The processor 110 executes the logic 200 to perform an off-line optical parameter optimization process. Optimization parameter data obtained as a result of the analysis computations performed by the processor 110 are stored in an optimization parameters database 130.

In general, the functions of the OCP server 100 may be implemented by logic encoded in one or more tangible media (e.g., embedded logic such as an application specific integrated circuit, digital signal processor instructions, software that is executed by a processor, etc.), wherein the memory 120 stores data used for the computations described herein and/or to store software or processor instructions that are executed to carry out the computations described herein. Thus, the process 200 may be implemented with fixed logic or programmable logic (e.g., software/computer instructions executed by a processor) and the processor 110 may be a programmable processor, programmable digital logic (e.g., field programmable gate array) or an application specific integrated circuit (ASIC) that comprises fixed digital logic, or a combination thereof.

Reference is now made to FIG. 8 for a description of the off-line optical parameter optimization logic 200. The OCP server 100 is periodically or on-demand connected to the OCP clients 15 in the network in order to "optimize" the optical resources in the network so that the embedded OCP clients 15 can later restart path route computations and routing from an optimized status of the network. Any OCP client 15 may query off-line the OCP server 100 for optimization and adjustment of optical starting parameters that will be used for a subsequent DWM-aware calculation for a path route. Thus, at 210, the OCP server 100 connects to the OCP clients 15 in the OCP of the optical network. This connection between the OCP server 100 at the OCP clients 15 may be made periodically or on-demand, and the OCP server 100 gathers from the OCP clients 15 data needed for path route computation and analysis (optical feasibility).

At 220, the OCP server 100 determines (off-line) optical feasibility of at least one path route based on data obtained from multiple OCP clients 15. In performing this function, the OCP server 100 is no longer connected to and communicating with the OCP clients 15. That is, the OCP server 100 makes the computations at 220 without real-time communication between with the OCP clients 15. The OCP server 100 performs these computations off-line, thus avoiding the need for complex signaling between it and the OCP clients 15 and any other network elements in the optical network. More specifically, the optical feasibility of at least one path route from a source node to a destination node is determined from optical parametric information based on data obtained from multiple client control devices pertaining to the at least one path route in the optical network. The function 220 is similar to that described above in connection with FIG. 3A and the foregoing optical feasibility determination schemes for a path route. However, the OCP server 100 makes these computations off-line as explained above. At 230, the OCP server 100 stores data resulting from the feasibility analysis determined for the at least one path route.

At 240, the OCP server 100 sends data resulting from the feasibility analysis, including optical starting parameters, to the OCP clients 15 (either in response to a query or request from the OCP clients 15, or periodically). Since the OCP server 100 makes the calculations at 220 during periods of time that the OCP server 100 is not otherwise on-line making other operational or performance adjustments, it can run more complex network computations since it is not constrained to complete its analysis in an otherwise much shorter time period. The OCP clients 15 receive and store the data obtain from the OCP server 100 that was created during an off-line optimization session as optical starting parameters for a subsequent DWDM-aware computation (path route determination/feasibility analysis).

The hybrid adaptive distributed scheme with off line adaptive centralized computations of physical impairments has advantages for a DWDM-aware optical control plane. The centralized OCP server 100 has a global view of the optical network but does not need a fast, continuous and reliable communication channel with the control plane. The centralized OCP server 100 optimizes off-line the optical starting parameter for DWDM aware computations and supplies the results of these computations to the control plane (i.e., to the OCP clients 15). As a result, the OCP clients 15 will always perform DWDM-aware computations in the embedded distributed path route feasibility determinations using the best available data concerning the optical network, but without the substantial (on-line) signaling that would otherwise be required between the OCP server 100 and the elements in the optical network while those computations are being made. Furthermore, since the OCP server 100 makes the computations off-line (without the need for a real-time communication channel), it can perform more complex and computationally intensive calculations for a more precise optimization analysis. Thus, the techniques described herein combine together the advantages of a centralized optimization analysis scheme and a distributed scheme.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. A method comprising:
    connecting a central control server to multiple client control devices each of which resides in a node in a dense wavelength division multiplexed (DWDM) optical network, wherein each client control device is part of an optical control plane associated with the optical network and also part of an electronic network control plane associated with a network management system;
    determining at least an initial path for routing messages from a source node to a destination node through the DWDM optical network via the electronic network control plane of the network management system;
    providing the determined initial path route from the electronic network control plane to the central control server;
    obtaining data for path route analysis at the central control server from each of the client control devices, wherein the obtained data comprises optical performance information about each client control device within the DWDM optical network accessible for use by the central control server without providing the obtained data to the electronic network control plane;
    at the central control server, determining optical feasibility of at least one path route from a source node to a destination node from optical parametric information based on the data obtained from multiple client control devices and without real-time communication between the central control server and the multiple client control devices during said determining of the optical feasibility;

storing data pertaining to optical feasibility determined for the at least one path route; and in response to a determination by the central control server that the initial determined path route from the source node to the destination node is not optically feasible, providing instructions from the central control server to the network management system to select a re-routed path from the source node to the destination node.

2. The method of claim 1, wherein said determining of the optical feasibility comprises determining information comprising optical power, optical noise, wavelength and optical tilt with respect to the path route.

3. The method of claim 1, wherein said determining of the optical feasibility comprises calculating whether an optical signal along said path route from said from said source node to said destination node meets predetermined signal criteria from said optical parametric information.

4. The method of claim 1, wherein determining of the optical feasibility comprises obtaining optical parametric information for each node along said path route between said source node and said destination node, and determining optical feasibility of said path route from a given node to a next node in said path route between said source node and said destination node from said optical parametric information.

5. The method of claim 1, and further comprising transmitting from the central control server to each client control device the data pertaining to the optical feasibility including optical starting parameters.

6. The method of claim 5, and further comprising receiving and storing at each client control device the data pertaining to the optical feasibility including optical starting parameters which each client control device uses for a subsequent path route determination.

7. An apparatus comprising:
at least one processor;
at least one memory coupled to the processor, wherein the memory stores instructions that, when executed by the processor, cause the processor to:
connect a central control server to multiple client control devices each of which resides in a node in a dense wavelength division multiplexed (DWDM) optical network, wherein each client control device is part of an optical control plane associated with the optical network and also part of an electronic network control plane associated with a network management system, the network management system determining at least an initial path for routing messages through the DWDM optical network;
obtain data for path route analysis by the central control server from the client control devices, wherein the obtained data comprises optical performance information about each client control device within the DWDM optical network accessible for use by the central control server without providing the obtained data to the electronic network control plane;
determine optical feasibility of at least one path route from a source node to a destination node from optical parametric information based on the data obtained from multiple client control devices and without real-time communication between the central control server and the multiple client control devices;
store data pertaining to optical feasibility determined for the at least one path route; and
in response to the central control server receiving the determined initial path route from the electronic control plane and making a determination that the determined initial path route is not optically feasible, provide instructions from the central control server to the network management system to select a re-routed path from the source node to the destination node.

8. The apparatus of claim 7, wherein the instructions stored in the memory that cause the processor to determine the optical feasibility comprise instructions that cause the processor to determine information comprising optical power, optical noise, wavelength and optical tilt with respect to at least one path route.

9. The apparatus of claim 8, wherein the instructions stored in the memory that cause the processor to determine the optical feasibility comprise instructions that cause the processor to calculate whether an optical signal along said path route from said source node to said destination node meets predetermined signal criteria from said optical parametric information.

10. The apparatus of claim 7, wherein the instructions stored in the memory that cause the processor to determine the optical feasibility comprise instructions that cause the processor to obtain optical parametric information for each node along said path route between said source node and said destination node, and determine optical feasibility of said path route from a given node to a next node in said path route between said source node and said destination node from said optical parametric information.

11. The apparatus of claim 7, and further comprising instructions that, when executed by the processor, cause the processor to transmit to each client control device the data pertaining to the optical feasibility including optical starting parameters to enable each client control device to use the optical starting parameters for a subsequent path route determination.

12. Logic encoded in one or more tangible media for execution and when executed operable to:
connect a central control server to multiple client control devices each of which resides in a node in a dense wavelength division multiplexed (DWDM) optical network, wherein each client control device is part of an optical control plane associated with the optical network and also part of an electronic network control plane associated with a network management system, the network management system determining at least an initial path for routing messages through the DWDM optical network;
obtain data for path route analysis by the central control server from the client control devices, wherein the obtained data comprises optical performance information about each client control device within the DWDM optical network accessible for use by the central control server without providing the obtained data to the electronic network control plane;
at the central control server, determine optical feasibility of at least one path route from a source node to a destination node from optical parametric information based on the data obtained from multiple client control devices and without real-time communication between the central control server and the multiple client control devices;
store data pertaining to optical feasibility determined for the at least one path route; and
in response to a determination at the central control server that the initial determined path route from a source node to a destination node is not optically feasible, provide instructions from the central control server to the network management system to select a re-routed path from the source node to the destination node.

13. The logic of claim 12, wherein the logic that determines the optical feasibility comprises logic that is configured to determine information comprising optical power, optical noise, wavelength and optical tilt with respect to at least one path route.

14. The logic of claim 13, wherein the logic that determines the optical feasibility comprises logic that is configured to calculate whether an optical signal along said path route from said from said source node to said destination node meets predetermined signal criteria from said optical parametric information.

15. The logic of claim 14, wherein the logic that determines the optical feasibility comprises logic that is configured to obtain optical parametric information for each node along said path route between said source node and said destination node, and determines optical feasibility of said path route from a given node to a next node in said path route between said source node and said destination node from said optical parametric information.

16. The logic of claim 14, and further comprising logic that is configured to send to each client control device the data pertaining to the optical feasibility including optical starting parameters to enable each client control device to use the optical starting parameters for a subsequent path route determination.

17. The method of claim 1, further comprising:
in response to receiving an off-line request at the central control server from a querying client control device for optimization and adjustment of optical starting parameters, transmitting from the central control server to the querying client control device the data pertaining to optical feasibility including optical starting parameters.

18. The apparatus of claim 11, wherein the instructions, when executed by the processor, cause the processor to transmit to a client control device the data pertaining to optical feasibility based upon the client control device transmitting an off-line request for the data to the central control server.

19. The logic of claim 16, wherein the logic is further configured to send data pertaining to optical feasibility to a client control device in response to the client control device requesting the data from the central control server.

* * * * *